US009633264B2

United States Patent
Yano et al.

(10) Patent No.: US 9,633,264 B2
(45) Date of Patent: Apr. 25, 2017

(54) OBJECT RETRIEVAL USING BACKGROUND IMAGE AND QUERY IMAGE

(71) Applicant: CANON KABUSHIKI KAISHA, Tokyo (JP)

(72) Inventors: Kotaro Yano, Tokyo (JP); Hiroshi Tojo, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 59 days.

(21) Appl. No.: 14/658,590

(22) Filed: Mar. 16, 2015

(65) Prior Publication Data

US 2015/0279054 A1 Oct. 1, 2015

(30) Foreign Application Priority Data

Mar. 26, 2014 (JP) ................. 2014-064342

(51) Int. Cl.
*G06K 9/00* (2006.01)
*G06K 9/46* (2006.01)
*G06K 9/62* (2006.01)

(52) U.S. Cl.
CPC ..... *G06K 9/00771* (2013.01); *G06K 9/00369* (2013.01); *G06K 9/4642* (2013.01); *G06K 9/6269* (2013.01)

(58) Field of Classification Search
CPC ............... G06K 9/6267; G06K 9/4671; G06K 9/00288; G06K 9/46; G06K 2209/21; G06F 17/30244; G06F 17/30277
See application file for complete search history.

(56) References Cited

U.S. PATENT DOCUMENTS

| 7,680,339 | B2 | 3/2010 | Tojo |
| 8,787,629 | B2 | 7/2014 | Kaneda et al. |
| 8,923,554 | B2 | 12/2014 | Yano |
| 8,929,595 | B2 | 1/2015 | Suzuki et al. |
| 9,036,863 | B2 | 5/2015 | Yano |
| 9,036,917 | B2 | 5/2015 | Kaneda et al. |
| 2012/0092495 | A1 | 4/2012 | Yano |
| 2012/0301032 | A1* | 11/2012 | Kawanishi ........ G06F 17/30247 382/190 |

(Continued)

OTHER PUBLICATIONS

Q. Zhu et al., "Fast Human Detection Using a Cascade of Histograms of Oriented Gradients", Proceedings of the IEEE Conference on Computer Vision and Pattern Recognition, 2006.

(Continued)

*Primary Examiner* — Vu Le
*Assistant Examiner* — Guillermo Rivera-Martinez
(74) *Attorney, Agent, or Firm* — Fitzpatrick, Cella, Harper & Scinto

(57) ABSTRACT

Each of a plurality of cameras is sequentially selected. An image that does not include a retrieval target object is acquired, as a background image, from an image group captured by a selected camera. An image including the retrieval target object is acquired as a query image. A discriminator being used for identifying the retrieval target object from the image captured by the selected camera is learned using the background image and the query image. The retrieval target object is retrieved from the image group captured by the selected camera using the learned discriminator.

6 Claims, 9 Drawing Sheets

(56) References Cited

U.S. PATENT DOCUMENTS

| | | | |
|---|---|---|---|
| 2012/0310968 A1* | 12/2012 | Tseng | G06F 17/30247 707/769 |
| 2013/0064425 A1 | 3/2013 | Sagawa et al. | |
| 2013/0142401 A1 | 6/2013 | Nomoto et al. | |
| 2013/0271667 A1 | 10/2013 | Tojo | |
| 2014/0056473 A1 | 2/2014 | Tojo | |
| 2014/0201126 A1* | 7/2014 | Zadeh | G06K 9/627 706/52 |
| 2015/0138386 A1 | 5/2015 | Yano et al. | |
| 2015/0254510 A1* | 9/2015 | McKinnon | G06F 17/30244 382/103 |

OTHER PUBLICATIONS

N. Dalal et al., "Histograms of Oriented Gradients for Human Detection", Proceedings of the IEEE Conference on Computer Vision and Pattern Recognition, 2005.

U.S. Appl. No. 14/529,676, filed Oct. 31, 2014. Applicant: Yano, et al.

* cited by examiner

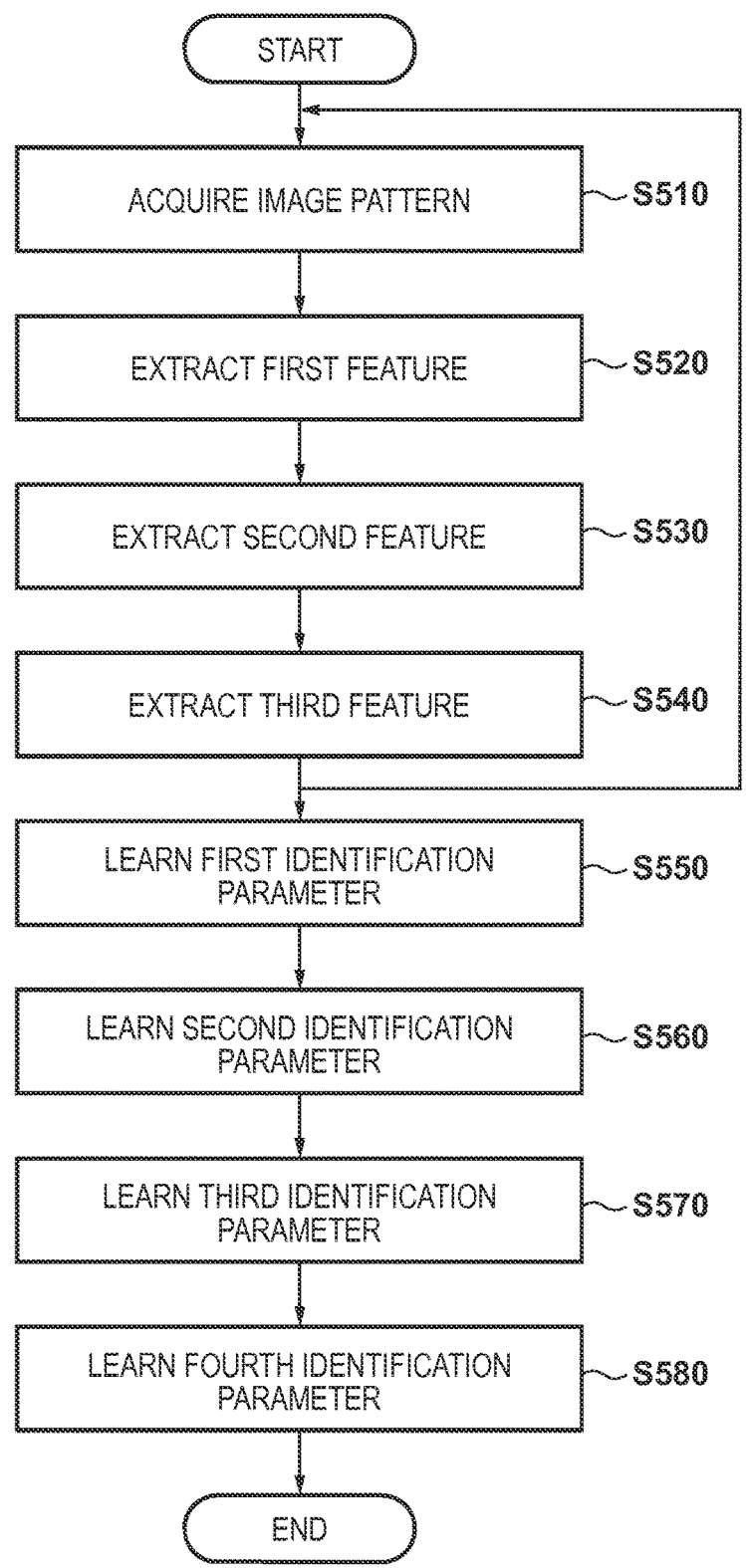

OBJECT RETRIEVAL USING BACKGROUND IMAGE AND QUERY IMAGE

BACKGROUND OF THE INVENTION

Field of the Invention

The present invention relates to a technique of retrieving a specific object from an image.

Description of the Related Art

In recent years, an enormous number of monitoring cameras have been introduced for the purpose of monitoring persons. There have been proposed many systems for supporting the operations of the monitoring cameras. In particular, retrieving a specific person from many monitoring camera videos is one of important applications.

To retrieve a specific person from videos of a large-scale monitoring camera system, the following scenario is assumed. That is, based on information about where and when the retrieval target person existed, cameras and times are narrowed down, and human videos are retrieved from past videos. In addition, the current location of the retrieval target person is retrieved from many camera videos. In practice, however, it is difficult to quickly retrieve the human videos from many camera videos. If the retrieval takes a long time, the retrieval target person moves. Hence, an application for automatically retrieving a similar person using a human video retrieved from past videos as a query is important.

For example, assume that the human video obtained as a query includes a person in red. In that case, a method is considerable that detects a human region from each frame of a monitoring video, and a color feature is acquired from the clothing portion of the detected human region and compared with the query, thereby obtaining retrieval candidates. A method of detecting a human region from a video is disclosed in, for example, Q. Zhu, S. Avidan, M. C. Yeh, and K. T. Cheng, "Fast Human Detection Using a Cascade of Histograms of Oriented Gradients", Proceedings of the IEEE Conference on Computer Vision and Pattern Recognition, 2006. According to this method, many detection windows extracted from an input image are collated with dictionary data learned in advance using an enormous number of human images, thereby implementing accurate human region detection. In addition, a Histogram of Oriented Gradients (to be referred to as HOG hereinafter) feature amount effective to detect a person is obtained using an integrated image, and a cascade discriminator obtained by AdaBoost learning is applied, thereby implementing speedup. The cascade discriminator is a method of efficiently narrowing down the detection target by connecting a plurality of discriminators in series.

However, when retrieving a person in red, it is not efficient to detect unnecessary persons (here, persons who are not in red) in human region detection. The appearance of a person changes depending on the clothing and orientation, or various shooting situations and scenes. To narrow down such varying human images using the cascade discriminator, the arrangement of the cascade discriminator becomes complex more than necessary. Additionally, in the human region detection method of Q. Zhu, S. Avidan, M. C. Yeh, and K. T. Cheng, "Fast Human Detection Using a Cascade of Histograms of Oriented Gradients", Proceedings of the IEEE Conference on Computer Vision and Pattern Recognition, 2006, a detection error occurs in the background portion other than the human region.

SUMMARY OF THE INVENTION

The present invention has been made in consideration of the above problems, and provides a technique of accurately detecting a retrieval target and efficiently retrieving the retrieval target without making the arrangement of a discriminator complex more than necessary.

According to the first aspect of the present invention, there is provided an image retrieval apparatus comprising: a selection unit configured to sequentially select each of a plurality of cameras; a first acquisition unit configured to acquire, from an image group captured by a camera selected by the selection unit, an image that does not include a retrieval target object as a background image; a second acquisition unit configured to acquire an image including the retrieval target object as a query image; a learning unit configured to learn, using the background image and the query image, a discriminator being used for identifying the retrieval target object from an image captured by the selected camera; and a retrieval unit configured to retrieve the retrieval target object from the image group captured by the selected camera using the discriminator learned by the learning unit.

According to the second aspect of the present invention, there is provided an image retrieval method performed by an image retrieval apparatus, the method comprising: a selection step of sequentially selecting each of a plurality of cameras; a first acquisition step of acquiring, from an image group captured by a camera selected in the selection step, an image that does not include a retrieval target object as a background image; a second acquisition step of acquiring an image including the retrieval target object as a query image; a learning step of learning, using the background image and the query image, a discriminator being used for identifying the retrieval target object from an image captured by the selected camera; and a retrieval step of retrieving the retrieval target object from the image group captured by the selected camera using the discriminator learned in the learning step.

Further features of the present invention will become apparent from the following description of exemplary embodiments (with reference to the attached drawings).

BRIEF DESCRIPTION OF THE DRAWINGS

FIG. 6 is a flowchart of processing performed by the discriminator learning unit 500;

DESCRIPTION OF THE EMBODIMENTS

The embodiments of the present invention will now be described with reference to the accompanying drawings. Note that the embodiments to be described below are examples of detailed implementation of the present invention or detailed examples of the arrangement described in the appended claims.

First Embodiment

Figure 2:
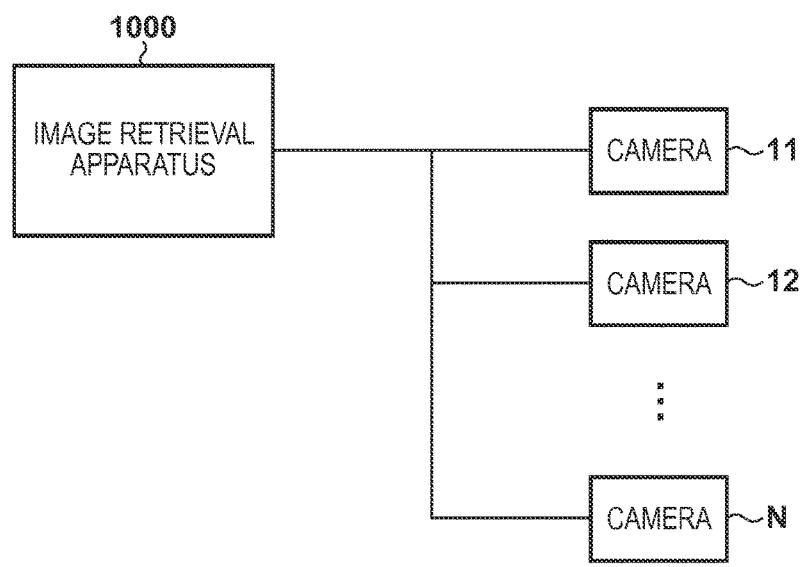
FIG. 2 is a block diagram showing an example of the schematic arrangement of a system.

An example of the schematic arrangement of a system according to this embodiment will be described first with reference to FIG. 2. As shown in FIG. 2, a plurality of cameras (cameras 11, 12, ..., N) are connected to an image retrieval apparatus 1000 according to this embodiment, and images captured by the cameras are input to the image retrieval apparatus 1000. Note that the connection between the image retrieval apparatus 1000 and the cameras can be either wired connection or wireless connection.

Figure 1:
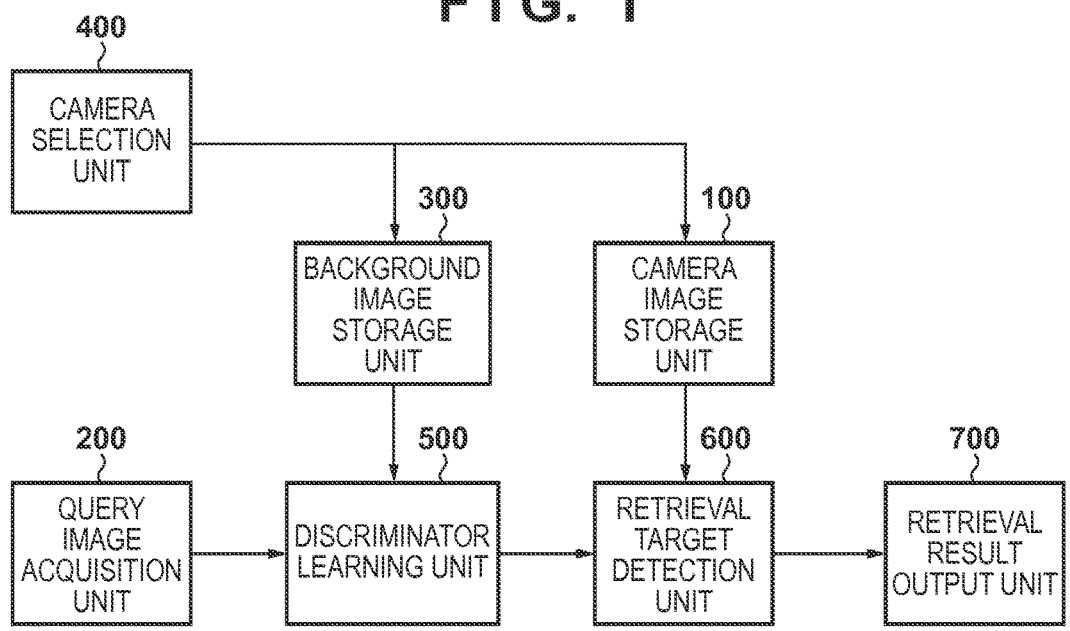
FIG. 1 is a block diagram showing an example of the functional arrangement of an image retrieval apparatus 1000.

An example of the functional arrangement of the image retrieval apparatus 1000 according to this embodiment will be described next with reference to the block diagram of FIG. 1. Note that the components shown in FIG. 1 are main components that appear in processing to be described below, and do not intend that the image retrieval apparatus 1000 according to this embodiment should be formed from only the components shown in FIG. 1. The arrangement shown in FIG. 1 is merely an example, and any other arrangement can be employed as long as it can implement the operations to be described below.

A camera selection unit 400 sequentially selects each of the plurality of cameras (cameras 11, 12, ..., N in FIG. 2) connected to the apparatus. For example, the camera selection unit 400 selects the cameras in the order of the camera 11, camera 12, ..., every predetermined time. A captured image from the camera selected by the camera selection unit 400 is stored in a camera image storage unit 100 together with the capturing time (date/time) of the captured image and the identification information of the camera that has captured the image. As for the capturing time, a capturing time measured on the camera side may be attached to the captured image and sent to the image retrieval apparatus 1000. Alternatively, a capturing time measured on the side of the image retrieval apparatus 1000 may be attached to the captured image received from the camera. This also applies to the identification information.

A query image acquisition unit 200 acquires an image including a retrieval target object as a query image. The query image acquisition method is not limited to a specific method. For example, a captured image group stored in the camera image storage unit 100 is listed on a display screen (not shown), and the user visually confirms images including the retrieval target object. After the confirmation, the user designates one image (image including the retrieval target object) using an operation unit (not shown), and the query image acquisition unit 200 acquires the image as a query image.

A description will be made below assuming that the retrieval target object is a person. Even if the retrieval target object is not a person, the essence of the following description does not change.

A background image storage unit 300 generates and holds a background image for each camera connected to the apparatus. The "background image" is an image without any person, and is obtained, for each camera, from the captured image group (in the camera image storage unit 100) captured by the camera. For example, when generating a background image for a given camera (to be referred to as a camera C hereinafter), a region where the change amount between frames is equal to or smaller than a predetermined value is extracted from the captured image of each frame captured by the camera C within a predetermined capturing period. Images in the extracted regions are composited, and the composite image is acquired as the "background image" for the camera C. Note that since the background image may change in accordance with the capturing time, a plurality of background images of different capturing times are desired to be stored for each camera.

Using the query image acquired by the query image acquisition unit 200 and the background image held by the background image storage unit 300, a discriminator learning unit 500 learns a discriminator used to discriminate the retrieval target object from each captured image.

A retrieval target detection unit 600 retrieves the retrieval target object from the captured image group held by the camera image storage unit 100 using the discriminator learned by the discriminator learning unit 500. A retrieval result output unit 700 outputs the retrieval result of the retrieval target detection unit 600 to an appropriate output destination.

Figure 3:
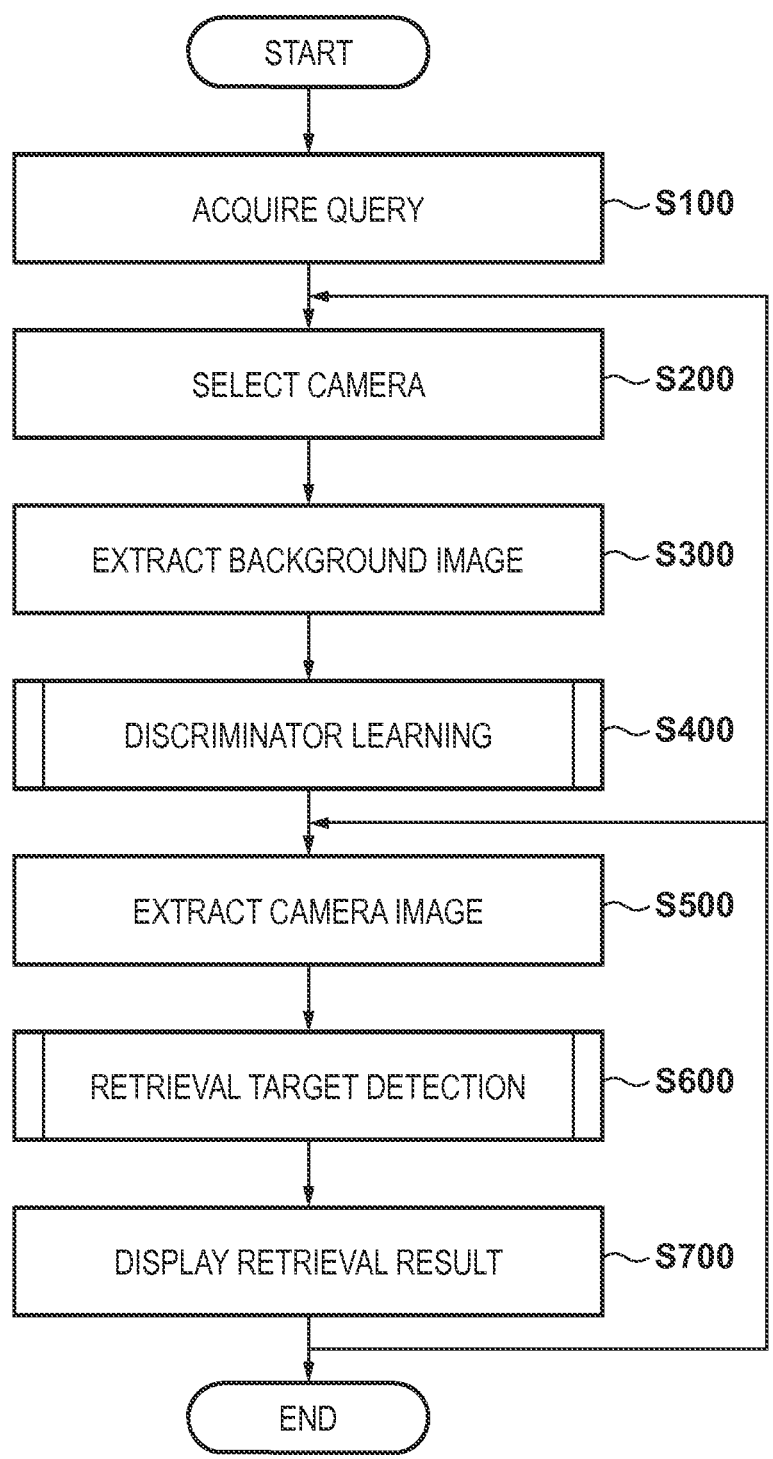
FIG. 3 is a flowchart of processing performed by the image retrieval apparatus 1000.

Processing performed by the image retrieval apparatus 1000 according to this embodiment, that is, a series of processes of learning the discriminator and retrieving the retrieval target object from the captured image group using the learned discriminator will be described with reference to FIG. 3 that shows the flowchart of the processing. Note that when the processing according to the flowchart of FIG. 3 starts, the camera image storage unit 100 and the background image storage unit 300 already hold the above-described images.

In step S100, the query image acquisition unit 200 acquires a query image. As described above, the query image acquisition method is not limited to a specific acquisition method, and an example will be described below.

For example, based on information about where and when the retrieval target person existed, the user narrows down the captured images held by the camera image storage unit 100 by the camera and the capturing time. This narrowing-down can be performed by the user or the image retrieval apparatus 1000 based on an input condition. The images narrowed down are listed on the display screen (not shown), and the user retrieves a captured image including the retrieval target person while viewing the display screen. The user also designates, using a mouse (not shown) or the like, a rectangular region including a region where the target person is included in the retrieved captured image. The image in the designated rectangular region is acquired as the query image.

Figure 4:
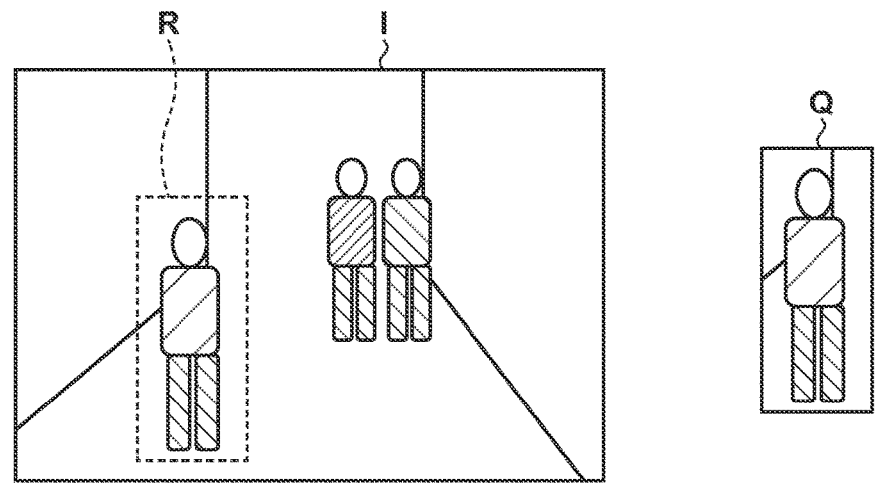
FIG. 4 is a view showing an example of a query image.

FIG. 4 shows an example of the query image. Referring to FIG. 4, I is a captured image retrieved by the user as an image including the retrieval target person out of the listed captured image group, R is a rectangular region designated by the user, and Q is an image in the rectangular region R, that is a query image. At this time, the user may designate a plurality of query images. When a plurality of query images are designated, the apparatus can cope with a change in the appearance of the retrieval target person in detection processing of the subsequent stage. In this embodiment, images similar to the image in the rectangular region designated by the user are extracted from the captured images of the same camera at preceding and subsequent times and added as query images. If the acquired query images have different image sizes, the image sizes of the query images are normalized to a predetermined size.

In step S200, the camera selection unit 400 selects one of the plurality of cameras connected to the apparatus. For example, in FIG. 2, the camera 11 is selected in step S200 of the first cycle, the camera 12 is selected in step S200 of the second cycle, and the camera N is selected in step S200 of the Nth cycle. The camera 11 is selected again in step S200 of the (N+1)th cycle. In this way, the camera selection unit 400 sequentially repetitively selects each of the plurality of cameras connected to the apparatus. The camera selected in step S200 will be referred to as a selected camera hereinafter.

In step S300, the background image storage unit 300 sends a background image generated from the captured images of the selected camera to the discriminator learning unit 500. More specifically, the background image storage unit 300 extracts, from the background image generated from the captured images of the selected camera, partial images of various sizes each having an aspect ratio close to that of the query image acquired in step S100. The background image storage unit 300 normalizes the extracted partial images to the same size as the query image, and sends the normalized partial images to the discriminator learning unit 500 as background images corresponding to the selected camera.

In step S400, the discriminator learning unit 500 performs discriminator learning using the query images acquired by the query image acquisition unit 200 and the background images sent from the background image storage unit 300. Details of the process of step S400 will be described later.

In step S500, the camera image storage unit 100 selects one unselected captured image out of the captured image group of the selected camera, and sends the selected captured image to the retrieval target detection unit 600.

In step S600, using the discriminator learned in step S400, the retrieval target detection unit 600 retrieves the retrieval target object from the captured image sent from the camera image storage unit 100 in step S500. Details of the process of step S600 will be described later.

In step S700, the retrieval result output unit 700 sends the retrieval result of step S600 to an appropriate output destination. Note that the series of processes of steps S500 to S700 is performed for each captured image of the selected camera. The series of processes of steps S200 to S700 is performed for each of the plurality of cameras connected to the apparatus.

Figure 5:
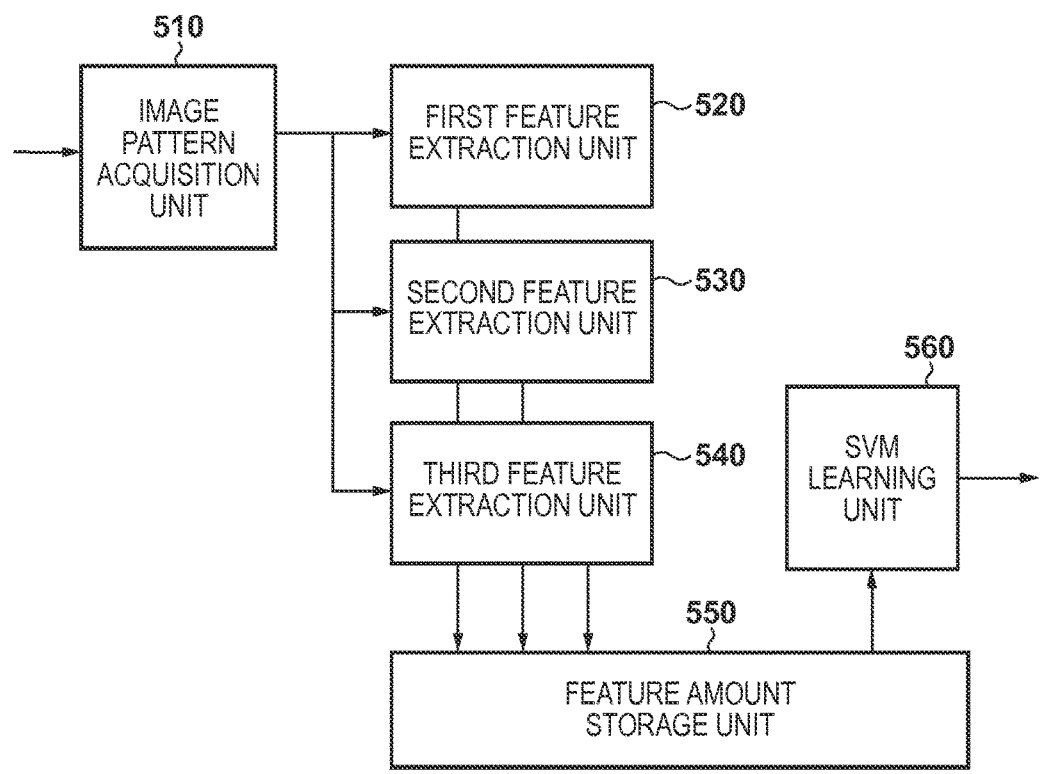
FIG. 5 is a block diagram showing an example of the functional arrangement of a discriminator learning unit 500.

An example of the functional arrangement of the discriminator learning unit 500 will be described next with reference to the block diagram of FIG. 5. An image pattern acquisition unit 510 acquires a query image sent from the query image acquisition unit 200 and a background image sent from the background image storage unit 300 as pattern images.

A first feature extraction unit 520 extracts a low-dimensional color feature (feature amount) from a pattern image acquired by the image pattern acquisition unit 510. A second feature extraction unit 530 extracts a high-dimensional color feature (feature amount) from the pattern image acquired by the image pattern acquisition unit 510. A third feature extraction unit 540 extracts an HOG feature (feature amount) from the pattern image acquired by the image pattern acquisition unit 510. A feature amount storage unit 550 stores the features (feature amounts) extracted by the first feature extraction unit 520, the second feature extraction unit 530, and the third feature extraction unit 540. An SVM learning unit 560 learns the discriminator using the features stored in the feature amount storage unit 550.

Details of the processing (step S400) performed by the discriminator learning unit 500 having the arrangement shown in FIG. 5 will be described with reference to FIG. 6. In step S510, the image pattern acquisition unit 510 acquires an image pattern and an image label representing whether the image pattern is a query image or a background image. The image label is generated by the issuance source of the corresponding image and sent together with the image.

Figure 7A:
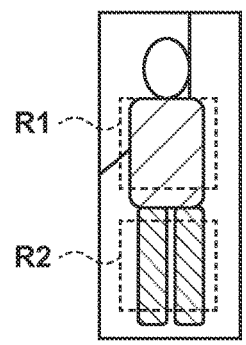
FIGS. 7A and 7B are views for explaining a color feature.

In step S520, the first feature extraction unit 520 extracts a low-dimensional color feature from the pattern image acquired by the image pattern acquisition unit 510. The color feature extracted by the first feature extraction unit 520 will be described with reference to FIG. 7A.

The color of a clothing portion is considered as a typical feature amount representing the feature of a person as a retrieval target object. In this embodiment, the average values of normalized RGB values are obtained from each of rectangular regions R1 and R2 shown in FIG. 7A. Let pi, qi, and ri be the R component value, the G component value, and the B component value, respectively, of a certain pixel Pi (i is the index of the pixel). The normalized RGB pixel values of the pixel Pi can be obtained as (pi/k, qi/k, ri/k) (k=pi+qi+ri). The average values of the normalized RGB values of the rectangular region R1 means the average values of the normalized RGB values obtained for each pixel in the rectangular region R1. This also applies to the rectangular region R2. In this case, the first feature extraction unit 520 extracts a color feature of six components (six dimensions) from the pattern image by connecting the average values (three, R, G, and B components) of normalized RGB values obtained from the rectangular region R1 and the average values (three, R, G, and B components) of normalized RGB values obtained from the rectangular region R2. The first feature extraction unit 520 stores the six-dimensional color feature in the feature amount storage unit 550.

In step S530, the second feature extraction unit 530 extracts a high-dimensional color feature from the pattern image acquired by the image pattern acquisition unit 510. The color feature extracted by the second feature extraction unit 530 will be described with reference to FIG. 7B.

Figure 7B:
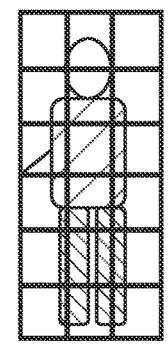

The second feature extraction unit 530 first divides the pattern image into 3×6 pixel blocks, as shown in FIG. 7B, and obtains the average values of normalized RGB values for each pixel block. The second feature extraction unit 530 connects the obtained average values to obtain a color feature of 3×6×3=54 dimensions, and stores the 54-dimensional color feature in the feature amount storage unit 550. Although the number of dimensions of the feature is larger than the color feature (first feature) extracted from the pattern image by the first feature extraction unit 520, the color feature (second feature) extracted from the pattern image by the second feature extraction unit 530 can express a more specific color feature, as shown in FIG. 7B.

In step S540, the third feature extraction unit 540 extracts the above-described HOG feature from the pattern image acquired by the image pattern acquisition unit 510. The third feature extraction unit 540 first divides the image pattern into a plurality of pixel blocks, like the second feature extraction unit 530. In this embodiment, the image pattern is divided into 7×15 pixel blocks in accordance with a method described in literature A below, and obtains an HOG feature of 9 bins for each pixel block.

(Literature A) Navneet Dalal and Bill Triggs, "Histograms of Oriented Gradients for Human Detection", Proceedings of the IEEE Conference on Computer Vision and Pattern Recognition, 2005

The third feature extraction unit 540 connects the HOG features obtained for the pixel blocks to obtain a color feature of 7×15×9=945 dimensions, and stores the 945-dimensional color feature in the feature amount storage unit 550. According to literature A described above, the color feature (third feature) extracted from the pattern image by the third feature extraction unit 540 can accurately specify the outline of a person and complement the color features by representing an edge characteristic.

Note that by the series of processes of steps S520 to S540, the color features are stored in the feature amount storage unit 550 in the following way.

$$(xi=(x1i,x2i,x3i),yi)$$

where x1i, x2i, and x3i are respectively a first feature, a second feature, and a third feature extracted from the ith pattern image acquired by the image pattern acquisition unit 510 for the selected camera, xi is a color feature (fourth feature) obtained by connecting x1i, x2i, and x3i, and yi is the image label of the ith pattern image acquired by the image pattern acquisition unit 510.

The series of processes of steps S510 to S540 is performed for all pattern images of the selected camera. When the processes of steps S510 to S540 are performed for all pattern images, the process advances to step S550.

In step S550, the SVM learning unit 560 learns a first identification parameter from the first feature stored in the feature amount storage unit 550. The SVM learning unit 560 learns the linear Support Vector Machine (SVM) using the sets (x1i, yi) of first features and image labels of all image patterns, and outputs a weight corresponding to each dimension of the color feature as a first identification parameter. The following learning including this step is performed by assigning a label yi=+1 to a query image and a label yi=−1 to a background image.

In step S560, the SVM learning unit 560 learns a second identification parameter from the second feature stored in the feature amount storage unit 550. The SVM learning unit 560 learns the linear SVM using the sets (x2i, yi) of second features and image labels of all image patterns, and outputs a weight corresponding to each dimension of the color feature as a second identification parameter.

In step S570, the SVM learning unit 560 learns a third identification parameter from the third feature stored in the feature amount storage unit 550. The SVM learning unit 560 learns the linear SVM using the sets (x3i, yi) of third features and image labels of all image patterns, and outputs a weight corresponding to each dimension of the color feature as a third identification parameter.

In step S580, the SVM learning unit 560 learns a fourth identification parameter from the fourth feature stored in the feature amount storage unit 550. The SVM learning unit 560 learns the linear SVM using the sets (xi, yi) of fourth features and image labels of all image patterns, and outputs a weight corresponding to each dimension of the color feature as a fourth identification parameter.

As described above, the SVM learning unit 560 performs calculation of the first identification parameter, the second identification parameter, the third identification parameter, and the fourth identification parameter as discriminator learning.

Figure 8:
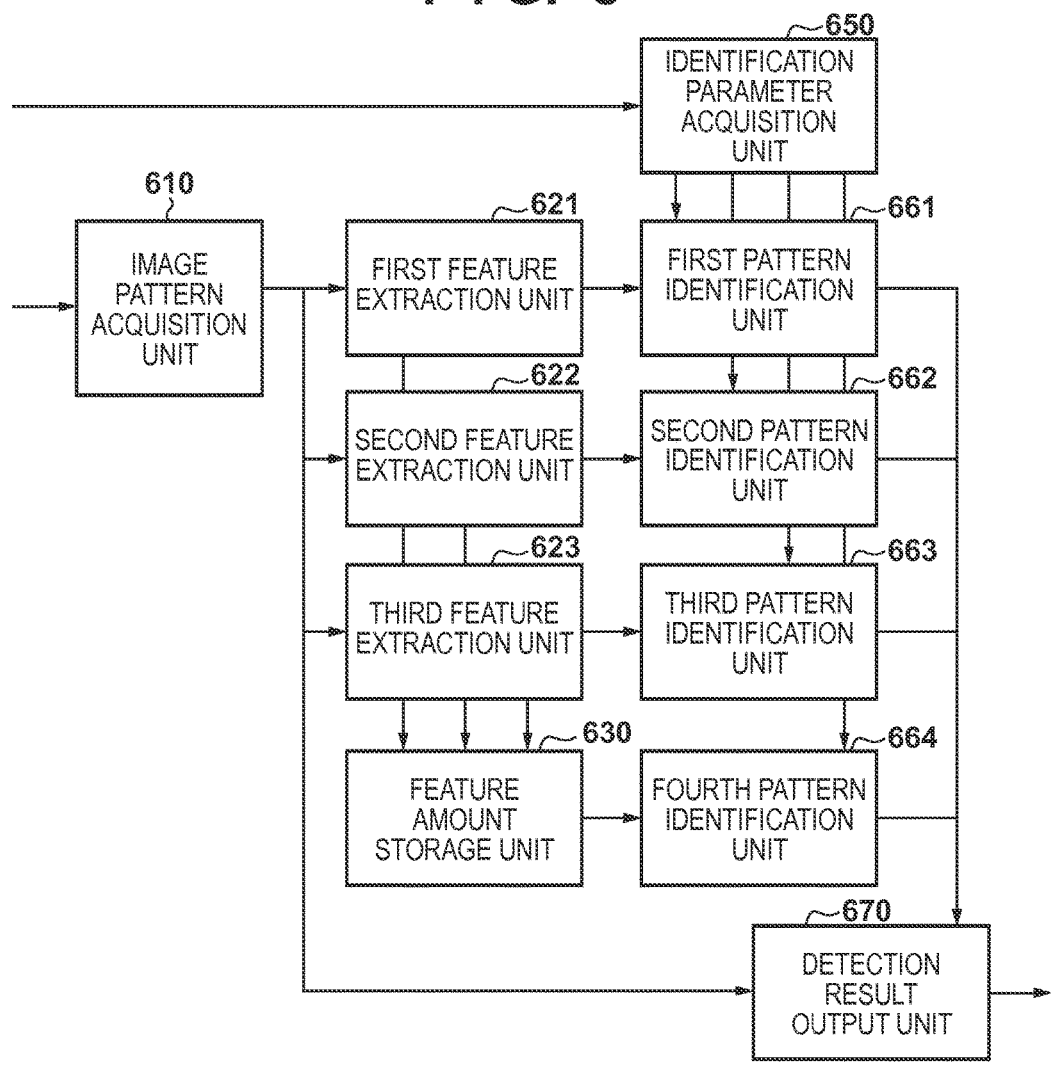
FIG. 8 is a block diagram showing an example of the functional arrangement of a retrieval target detection unit 600.

The functional arrangement of the retrieval target detection unit 600 will be described next with reference to the block diagram of FIG. 8. An image pattern acquisition unit 610 acquires a captured image sent from the camera image storage unit 100 as a pattern image.

A first feature extraction unit 621, a second feature extraction unit 622, and a third feature extraction unit 623 perform the same operations as the first feature extraction unit 520, the second feature extraction unit 530, and the third feature extraction unit 540, respectively. That is, the first feature extraction unit 621, the second feature extraction unit 622, and the third feature extraction unit 623 extract a first feature, a second feature, and a third feature, respectively, from the pattern image acquired by the image pattern acquisition unit 610.

The features (first feature, second feature, and third feature) extracted by the first feature extraction unit 621, the second feature extraction unit 622, and the third feature extraction unit 623 are stored in a feature amount storage unit 630.

An identification parameter acquisition unit 650 acquires, from the discriminator learning unit 500, the identification parameters (first identification parameter, second identification parameter, third identification parameter, and fourth identification parameter) of the discriminator learned by the discriminator learning unit 500.

A first pattern identification unit 661 retrieves (identifies) the retrieval target object from the image pattern acquired by the image pattern acquisition unit 610 using the first identification parameter acquired by the identification parameter acquisition unit 650 and the first feature extracted by the first feature extraction unit 621.

A second pattern identification unit 662 retrieves (identifies) the retrieval target object from the image pattern acquired by the image pattern acquisition unit 610 using the second identification parameter acquired by the identification parameter acquisition unit 650 and the second feature extracted by the second feature extraction unit 622.

A third pattern identification unit 663 retrieves (identifies) the retrieval target object from the image pattern acquired by the image pattern acquisition unit 610 using the third identification parameter acquired by the identification parameter acquisition unit 650 and the third feature extracted by the third feature extraction unit 623.

A fourth pattern identification unit 664 retrieves (identifies) the retrieval target object from the image pattern acquired by the image pattern acquisition unit 610 using a feature obtained by connecting the first feature, the second feature, and the third feature and the fourth identification parameter acquired by the identification parameter acquisition unit 650.

A detection result output unit 670 outputs a result corresponding to the identification results of the first pattern identification unit 661, the second pattern identification unit 662, the third pattern identification unit 663, and the fourth pattern identification unit 664.

Figure 9:
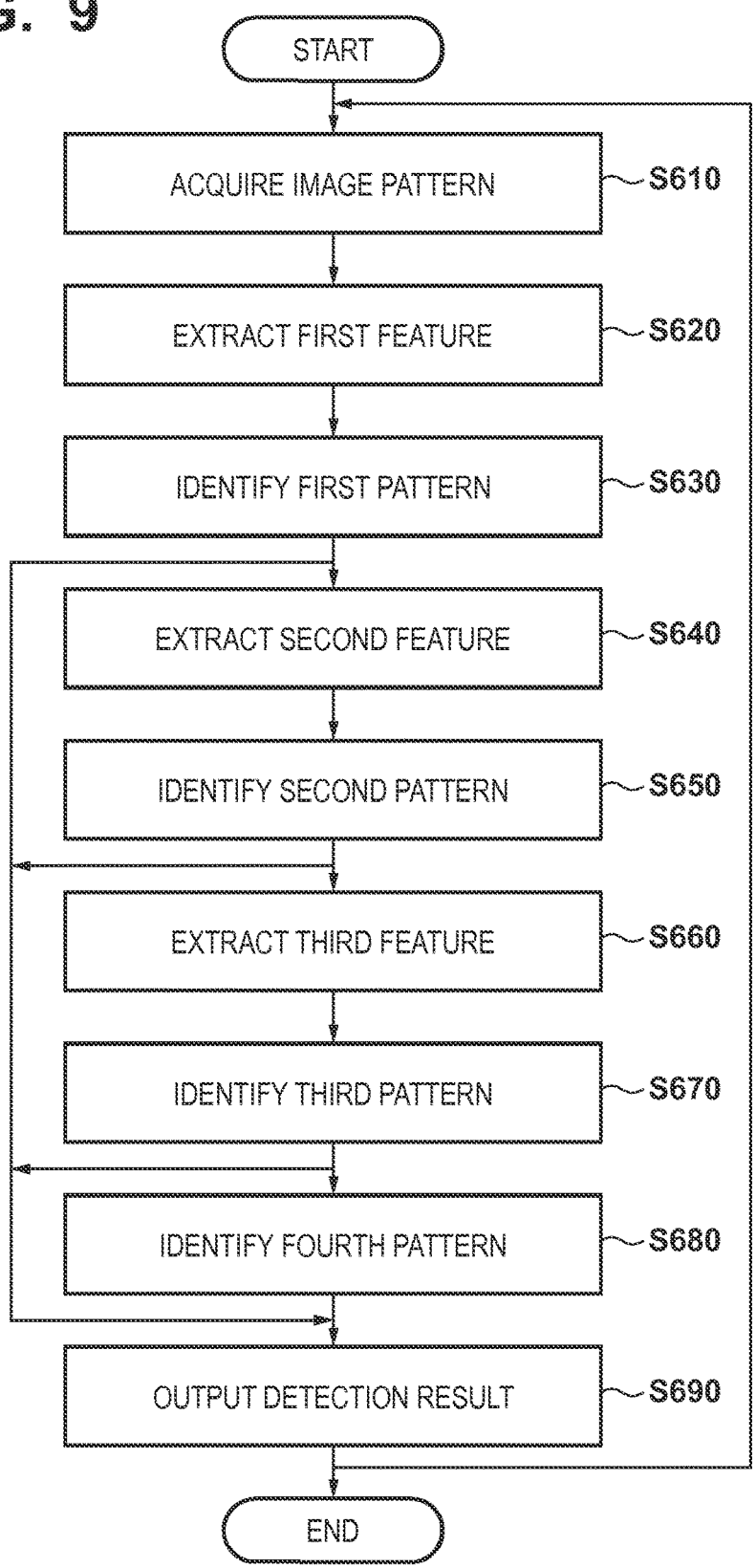
FIG. 9 is a flowchart of processing performed by the retrieval target detection unit 600.

Details of processing (step S600) performed by the retrieval target detection unit 600 having the arrangement shown in FIG. 8 will be described with reference to FIG. 9. Note that when starting the processing according to the flowchart of FIG. 9, the identification parameter acquisition unit 650 has already acquired the identification parameters (first to fourth identification parameters) of the discriminator learned by the discriminator learning unit 500.

In step S610, the image pattern acquisition unit 610 sets a rectangular region having a predetermined size at a set position (x, y) on the pattern image acquired from the camera image storage unit 100, extracts the image in the set rectangular region, and selects the extracted image newly as a pattern image. The set position (x, y) is updated every time the process of step S610 is performed, and the image in the rectangular region is extracted while moving the rectangular region within the pattern image by so-called sliding window retrieval. Note that the aspect ratio of the rectangular region is the same as that of the query image acquired in step S100. The image pattern acquisition unit 610 normalizes the image in the rectangular region to the same size as the query image acquired in step S100.

In step S620, the first feature extraction unit 621 performs the same process as in step S520, thereby extracting a first feature from the pattern image extracted in step S610. The first feature extraction unit 621 stores the extracted first feature in the feature amount storage unit 630.

In step S630, the first pattern identification unit 661 performs an inner product operation between the first feature (6-dimensional color feature in the above example) and the first identification parameter acquired by the identification parameter acquisition unit 650, and compares the inner product operation result with a predetermined threshold. If the inner product operation result is equal to or larger than the predetermined threshold as the result of comparison, the process advances to step S640 to perform pattern identification processing based on a color feature whose number of dimensions is larger. If the inner product operation result is smaller than the predetermined threshold, it is determined that the retrieval target object is not included in the pattern image extracted in step S610, and the process advances to step S690. In this case, in step S690, the retrieval result output unit 700 outputs information representing that the retrieval target object is not included in the pattern image extracted in step S610. Note that the operation of the retrieval result output unit 700 in this case is not limited to a specific operation, and the retrieval result output unit 700 may refrain from performing an operation.

Note that in normal SVM, determination is done based on whether the inner product operation result is 0 or more. In this embodiment, however, since any image pattern other than the retrieval target object is rejected by cascade connection of discriminators, the threshold is set to a value smaller than 0 in advance. With this threshold setting, only image patterns that can reliably be rejected are rejected, thereby preventing the detection ratio from lowering.

In step S640, the second feature extraction unit 622 performs the same process as in step S530, thereby extracting a second feature from the pattern image extracted in step S610. The second feature extraction unit 622 stores the extracted second feature in the feature amount storage unit 630.

In step S650, the second pattern identification unit 662 performs the inner product operation between the second feature (54-dimensional color feature in the above example) and the second identification parameter acquired by the identification parameter acquisition unit 650, and compares the inner product operation result with a predetermined threshold. If the inner product operation result is equal to or larger than the predetermined threshold as the result of comparison, the process advances to step S660 to perform pattern identification processing based on a color feature whose number of dimensions is larger. If the inner product operation result is smaller than the predetermined threshold, it is determined that the retrieval target object is not included in the pattern image extracted in step S610, and the process advances to step S690. In this case, in step S690, the retrieval result output unit 700 outputs information representing that the retrieval target object is not included in the pattern image extracted in step S610. Note that the operation of the retrieval result output unit 700 in this case is not limited to a specific operation, and the retrieval result output unit 700 may refrain from performing an operation. The threshold used in step S650 is set like the threshold used in step S630.

In step S660, the third feature extraction unit 623 performs the same process as in step S540, thereby extracting a third feature from the pattern image extracted in step S610. The third feature extraction unit 623 stores the extracted third feature in the feature amount storage unit 630.

In step S670, the third pattern identification unit 663 performs the inner product operation between the third feature (945-dimensional color feature in the above example) and the third identification parameter acquired by the identification parameter acquisition unit 650, and compares the inner product operation result with a predetermined threshold. If the inner product operation result is equal to or larger than the predetermined threshold as the result of comparison, the process advances to step S680 to perform pattern identification processing based on a color feature whose number of dimensions is larger. If the inner product operation result is smaller than the predetermined threshold, it is determined that the retrieval target object is not included in the pattern image extracted in step S610, and the process advances to step S690. In this case, in step S690, the retrieval result output unit 700 outputs information representing that the retrieval target object is not included in the pattern image extracted in step S610. Note that the operation of the retrieval result output unit 700 in this case is not limited to a specific operation, and the retrieval result output unit 700 may refrain from performing an operation. The threshold used in step S670 is set like the threshold used in step S630.

In step S680, the fourth pattern identification unit 664 performs the inner product operation between the fourth feature (color feature obtained by connecting the first feature, the second feature, and the third feature, and in the above example, 1005-dimensional color feature) and the fourth identification parameter acquired by the identification parameter acquisition unit 650. The fourth feature is obtained by connecting the first feature, the second feature, and the third feature stored in the feature amount storage unit 630 in steps S620, S640, and S660, respectively, and can be expressed as $$x = (x1, x2, x3)$$

where x1, x2, x3, and x are the first feature, the second feature, the third feature, and the fourth feature, respectively. The fourth pattern identification unit 664 compares the inner product operation result with a predetermined threshold "0". If the inner product operation result is equal to or larger than the predetermined threshold "0" as the result of comparison, it is determined that the retrieval target object is included in the pattern image extracted in step S610, and the process advances to step S690. In this case, in step S690, the retrieval result output unit 700 outputs information representing that the retrieval target object is included in the pattern image extracted in step S610. If the inner product operation result is smaller than the predetermined threshold, it is determined that the retrieval target object is not included in the pattern image extracted in step S610, and the process advances to step S690. In this case, in step S690, the retrieval result output unit 700 outputs information representing that the retrieval target object is not included in the pattern image extracted in step S610. Note that the operation of the retrieval result output unit 700 in this case is not limited to a specific operation, and the retrieval result output unit 700 may refrain from performing an operation.

The series of processes of steps S610 to S690 is repeated until the rectangular region of the predetermined size is set at all positions on the pattern image acquired from the camera image storage unit 100. That is, the series of processes of steps S610 to S690 is performed for rectangular regions located at all positions on the pattern image.

The operation of the retrieval target detection unit 600 described above is the following processing in the other words. Let D1, D2, . . . , DN (N is an integer: N≥2) be the numbers of dimensions (different numbers of dimensions) of the feature amounts extracted in the discriminator learning unit 500. D1<D2< . . . <DN. At this time, an evaluation value E(i) is calculated using the feature amount of the number Di of dimensions (1≤i<N−1) extracted from the captured image by the selected camera and a weight corresponding to the feature amount of the number Di of dimensions. If the evaluation value E(i) is equal to or larger than the threshold, the evaluation value E(i+1) is calculated. If the evaluation value E(N) is equal to or larger than the threshold, the captured image by the selected camera is output as the retrieval result.

The image patterns are sequentially narrowed down in steps S630, S650, and S670. Hence, the number of times of identification becomes smaller as the identification processing moves to the subsequent stage. The discriminator is configured such that in identification processing of the preceding stage, a feature of a small number of dimensions is used for identification, and the operation amount is small. Hence, the larger the operation amount of identification processing is, the smaller the number of times of identification is. It is therefore possible to efficiently narrow down the image patterns.

In this embodiment, identification processing of the preceding stage is identification processing by color features and is therefore suitable for retrieval of a person in a specific clothing color. In this embodiment, a background image corresponding to the camera selected by the camera selection unit 400 is extracted, and the discriminator is learned using a query image and the background image. When learning is done while switching the background image as the identification target on a camera basis, it is possible to efficiently narrow down the image patterns using a discriminator unique to each camera without making the arrangement of the discriminator complex more than necessary.

Second Embodiment

In the first embodiment, identification processing of the preceding stage is identification processing by color features. Hence, the identification processing is suitable for retrieval of a person in a specific clothing color. However, if the retrieval target person has the feature not in the color but in the pattern of clothing, the identification processing of the preceding stage is desired to be changed to identification processing by a feature, which is performed based on an edge with a small operation amount. That is, a cascade discriminator is desired to be formed by selecting a feature in accordance with the retrieval target. In this embodiment, an arrangement based on such a concept is employed.

In this embodiment, only a discriminator learning unit 500 and a retrieval target detection unit 600 are different from the first embodiment, and the rest is the same as in the first embodiment. Hence, the difference from the first embodiment, that is, the discriminator learning unit 500 and the retrieval target detection unit 600 will be described below. The rest of the arrangement is assumed to be the same as in the first embodiment unless otherwise specified.

Figure 10:
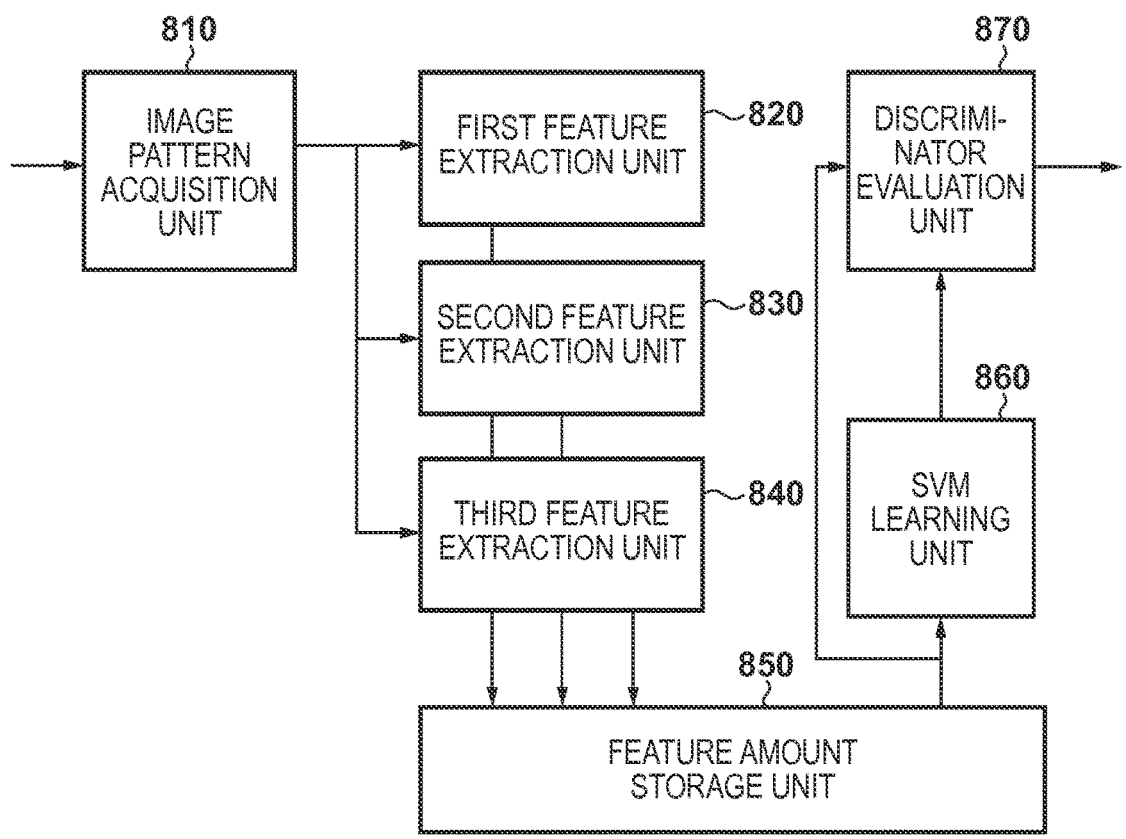
FIG. 10 is a block diagram showing an example of the functional arrangement of a discriminator learning unit 500.

An example of the functional arrangement of the discriminator learning unit 500 will be described first with reference to the block diagram of FIG. 10. An image pattern acquisition unit 810 acquires a query image sent from a query image acquisition unit 200 and a background image sent from a background image storage unit 300 as pattern images.

A first feature extraction unit 820 first feature extraction unit 820 extracts a high-dimensional color feature, that is, a second feature described in the first embodiment from a pattern image acquired by the image pattern acquisition unit 810. A second feature extraction unit 830 extracts a low-dimensional HOG feature, that is, a third feature described in the first embodiment from the pattern image acquired by the image pattern acquisition unit 810. A third feature extraction unit 840 extracts a high-dimensional HOG feature, that is, an HOG feature of higher dimensions than the third feature described in the first embodiment from the pattern image acquired by the image pattern acquisition unit 810. A feature amount storage unit 850 stores the features extracted by the first feature extraction unit 820, the second feature extraction unit 830, and the third feature extraction unit 840. An SVM learning unit 860 learns the discriminator using the features stored in the feature amount storage unit 850. A discriminator evaluation unit 870 evaluates the discriminator learned by the SVM learning unit 860, forms a cascade discriminator in accordance with the evaluation result, and outputs it.

Figure 11:
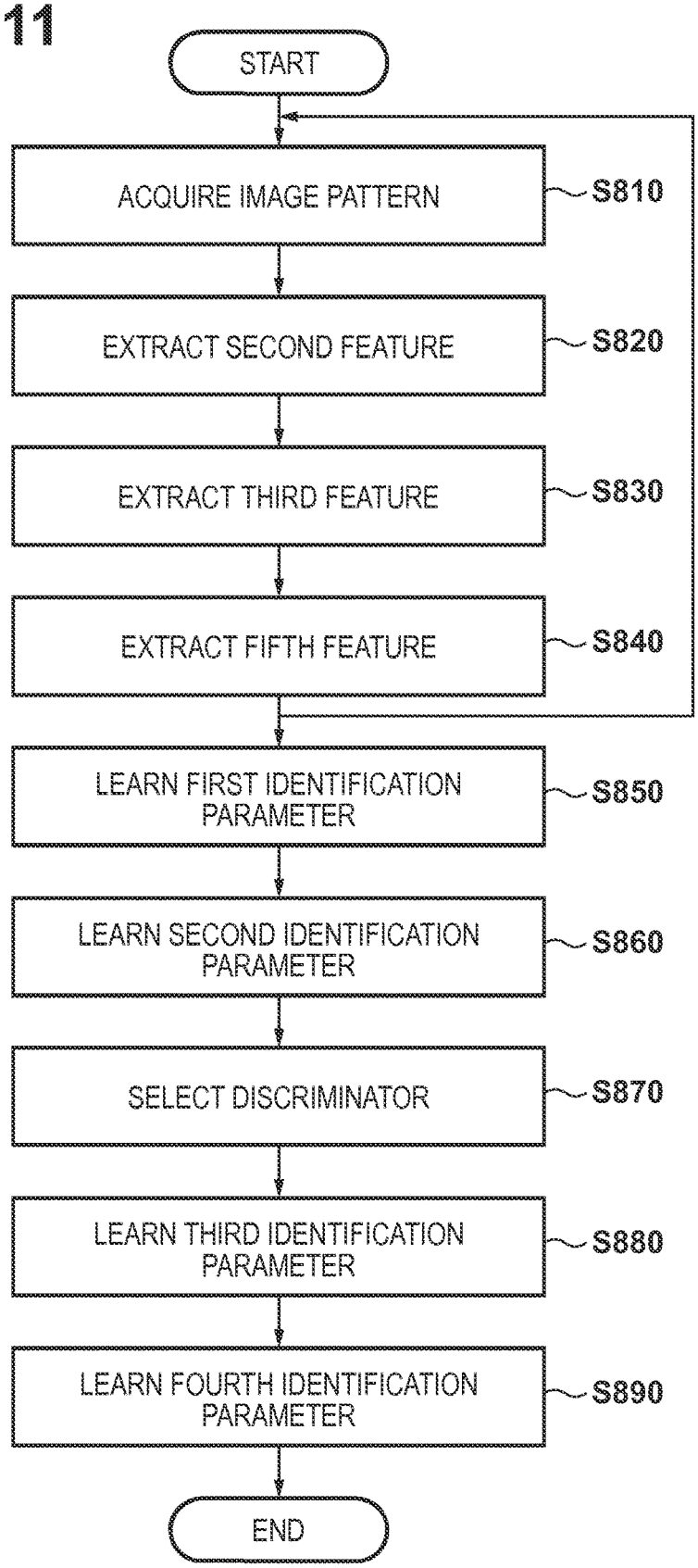
FIG. 11 is a flowchart of processing performed by the discriminator learning unit 500.

Details of the processing (step S400) performed by the discriminator learning unit 500 having the arrangement shown in FIG. 10 will be described with reference to FIG. 11. In step S810, the image pattern acquisition unit 810 acquires an image pattern and an image label representing whether the image pattern is a query image or a background image, as in step S510.

In step S820, the first feature extraction unit 820 extracts a high-dimensional color feature (second feature in the first embodiment) from the pattern image acquired by the image pattern acquisition unit 810, as in step S530, and stores the high-dimensional color feature in the feature amount storage unit 850.

In step S830, the second feature extraction unit 830 extracts a low-dimensional HOG feature (third feature in the first embodiment) from the pattern image acquired by the image pattern acquisition unit 810, and stores the low-dimensional HOG feature in the feature amount storage unit 850.

In step S840, the third feature extraction unit 840 extracts an HOG feature of higher dimensions than the third feature from the pattern image acquired by the image pattern acquisition unit 810 as a fifth feature, and stores the fifth feature in the feature amount storage unit 850. The "HOG feature of higher dimensions than the third feature" can be obtained by, for example, increasing the number of bins or the number of block divisions as compared to the third feature and then performing the same extraction method as that of the third feature.

The series of processes of steps S810 to S840 is performed for all pattern images of the selected camera. When the processes of steps S810 to S840 are performed for all pattern images, the process advances to step S850.

In step S850, the SVM learning unit 860 learns a first identification parameter (corresponding to the second identification parameter in the first embodiment) from the high-dimensional color feature stored in the feature amount storage unit 850, as in step S560.

In step S860, the SVM learning unit 860 learns a second identification parameter (corresponding to the third identification parameter in the first embodiment) from the low-dimensional HOG feature stored in the feature amount storage unit 850, as in step S570.

In step S870, the discriminator evaluation unit 870 evaluates the discriminator (first identification parameter) learned in step S850 and the discriminator (second identification parameter) learned in step S860, and forms a cascade discriminator in accordance with the evaluation result.

That is, the discriminator evaluation unit 870 estimates labels to the respective learning samples from the color features of all learning samples (image patterns) stored in the feature amount storage unit 850 and the first identification parameter learned in step S850. The discriminator evaluation unit 870 then compares the label estimated for each learning sample with the label of the learning sample stored in the feature amount storage unit 850, and evaluates the identification performance of the discriminator learned in step S850. For example, match/mismatch between a label estimated for each learning sample and the label of the learning sample stored in the feature amount storage unit 850 is determined, and the matching ratio is obtained as the identification performance of the discriminator learned in step S850. That is, the larger the number of matching labels is, the higher the identification performance is. Note that not the matching ratio but the similarity may be employed.

In addition, the discriminator evaluation unit 870 estimates labels to the respective learning samples from the low-dimensional HOG features of all learning samples (image patterns) stored in the feature amount storage unit 850 and the second identification parameter learned in step S860. The discriminator evaluation unit 870 then compares the label estimated for each learning sample with the label of the learning sample stored in the feature amount storage unit 850, and evaluates the identification performance of the discriminator learned in step S860. The evaluation of the identification performance is the same as the above-described processing.

The discriminator evaluation unit 870 compares the identification performance of the discriminator learned in step S850 with the identification performance of the discriminator learned in step S860, and sets the discriminator having higher identification performance to the discriminator of the preceding stage (the discriminator that starts processing first out of the cascade-connected discriminators). The discriminator evaluation unit 870 outputs information representing the type of feature used to learn the discriminator of the preceding stage and the identification parameter corresponding to the discriminator.

The discriminator evaluation unit 870 sets the discriminator having lower identification performance to the discriminator of the subsequent stage (the discriminator that starts processing next out of the cascade-connected discriminators). The discriminator evaluation unit 870 outputs information representing the type of feature used to learn the discriminator of the subsequent stage and the identification parameter corresponding to the discriminator.

At this time, when the operation amount in the extraction processing changes, like between the color feature and the HOG feature, a weight is added in consideration of each operation amount (the larger the operation is, the larger the added weight is), and the identification performances are compared.

In step S880, the SVM learning unit 860 learns a third identification parameter (different from the third feature in the first embodiment) from the fifth feature stored in the feature amount storage unit 850.

In step S890, the SVM learning unit 860 learns a fourth identification parameter from the fourth feature (connected feature of the second feature, the third feature, and the fifth feature) stored in the feature amount storage unit 850.

The functional arrangement and operation of the retrieval target detection unit 600 according to this embodiment are the same as in the first embodiment (FIGS. 8 and 9) except points to be described below. The differences from the first embodiment will mainly be described below.

In this embodiment, a first feature extraction unit 621, a second feature extraction unit 622, and a third feature extraction unit 623 perform the same operations as the first feature extraction unit 820, the second feature extraction unit 830, and the third feature extraction unit 840, respectively.

In step S620, out of the first feature extraction unit 621 and the second feature extraction unit 622, an extraction unit configured to extract a feature represented by the output "information representing the type of feature used to learn the discriminator of the preceding stage" from the discriminator evaluation unit 870 performs feature extraction. For example, if the feature used to learn the discriminator of the preceding stage is a high-dimensional color feature, the first feature extraction unit 621 performs feature extraction.

In step S630, out of a first pattern identification unit 661 and a second pattern identification unit 662, a pattern identification unit corresponding to the extraction unit that has performed feature extraction in step S620 performs pattern identification. For example, when the first feature extraction unit 621 has performed feature extraction in step S620, the first pattern identification unit 661 performs pattern identification. As in the first embodiment, if the inner product operation result is equal to or larger than a predetermined threshold, the process advances to step S640. If the inner product operation result is smaller than the predetermined threshold, it is determined that the retrieval target object is not included in the pattern image extracted in step S610, and the process advances to step S690.

In step S640, out of the first feature extraction unit 621 and the second feature extraction unit 622, an extraction unit configured to extract a feature represented by the output "information representing the type of feature used to learn the discriminator of the subsequent stage" from the discriminator evaluation unit 870 performs feature extraction. For example, if the feature used to learn the discriminator of the subsequent stage is a high-dimensional color feature, the first feature extraction unit 621 performs feature extraction.

In step S650, out of the first pattern identification unit 661 and the second pattern identification unit 662, a pattern identification unit corresponding to the extraction unit that has performed feature extraction in step S640 performs pattern identification. As in the first embodiment, if the inner product operation result is equal to or larger than a predetermined threshold, the process advances to step S660. If the inner product operation result is smaller than the predetermined threshold, it is determined that the retrieval target object is not included in the pattern image extracted in step S610, and the process advances to step S690.

In step S660, the third feature extraction unit 623 extracts a fifth feature from the pattern image extracted in step S610, and stores the fifth feature in a feature amount storage unit 630. In step S670, a third pattern identification unit 663 performs the inner product operation between the fifth feature and the third identification parameter acquired by the identification parameter acquisition unit 650, and compares the inner product operation result with a predetermined threshold. If the inner product operation result is equal to or larger than the predetermined threshold as the result of comparison, the process advances to step S680. If the inner product operation result is smaller than the predetermined threshold, it is determined that the retrieval target object is not included in the pattern image extracted in step S610, and the process advances to step S690.

In step S680, a fourth pattern identification unit 664 performs the inner product operation between the fourth feature (feature obtained by connecting the features extracted in steps S620, S640, and S660) and a fourth identification parameter acquired by the identification parameter acquisition unit 650. The subsequent processing is the same as in the first embodiment.

The operation of the retrieval target detection unit 600 described above is the following processing in the other words. Let D1, D2, . . . , DN (N is an integer: N≥2) be the numbers of dimensions (different numbers of dimensions) of the feature amounts extracted in the discriminator learning unit 500. D1<D2< . . . <DN. At this time, identification evaluation of the learned discriminator using the feature amounts of the numbers of dimensions is performed for each of the numbers D1, D2, . . . , DN of dimensions. The numbers D1, D2, . . . , DN of dimensions are arranged in ascending order of identification evaluation as D'1, D'2, . . . , D'N. At this time, an evaluation value E(i) is calculated using the feature amount of the number D'i of dimensions (1≤i<N−1) extracted from the captured image by the selected camera and a weight corresponding to the feature amount of the number D'i of dimensions. If the evaluation value E(i) is equal to or larger than the threshold, the evaluation value E(i+1) is calculated. If the evaluation value E(N) is equal to or larger than the threshold, the captured image by the selected camera is output as the retrieval result.

As described above, in this embodiment, two types of features, that is, a color feature and an HOG feature are learned, and the performances of the learned discriminators are compared using learning samples. Detection processing is performed by setting a discriminator learned by a feature of higher identification performance to the discriminator of the preceding stage and a discriminator learned by a feature of lower identification performance to the discriminator of the subsequent stage.

As described above, in learning of the cascade discriminator, feature amounts of high identification performances are sequentially selected from a plurality of types of feature amounts. It is therefore possible to do effective narrowing down by a feature amount unique to the retrieval target.

Note that in the above-described embodiment, an SVM is used as the learning machine in the discriminator learning unit 500. The SVM is a learning machine that generally has a high generalization performance and is suitable for a case where the number of learning samples is small. In this embodiment, a sample that is a retrieval target is acquired by the query image acquisition unit 200, and a background image stored in the background image storage unit 300 is used as a sample that is not a retrieval target. Hence, it is not always possible to ensure a sufficient number of learning samples. Discriminator learning by the SVM is effective under such a condition. However, the SVM is merely an example of a learning machine applicable to the discriminator learning unit 500, and any other learning machine, for example, AdaBoost or classification tree may be used.

In the above-described embodiment, learning is performed using an image including no person as a background image. However, the present invention is not limited to this. The quintessence is learning while discriminating a background pattern unique to a camera, which is different from a human image as indicated by Q in FIG. 4. Hence, for example, a person may partially be included in part of an image pattern.

Third Embodiment

All the functional units shown in FIG. 1 can be formed by hardware. However, some of them may be formed by software (computer programs). In this case, an apparatus that includes the background image storage unit 300, the camera image storage unit 100, and the feature amount storage units 550, 630, and 850 (only the holding function) as memories and can execute software corresponding to the remaining functional units can be applied to the image retrieval apparatus 1000.

Figure 12:
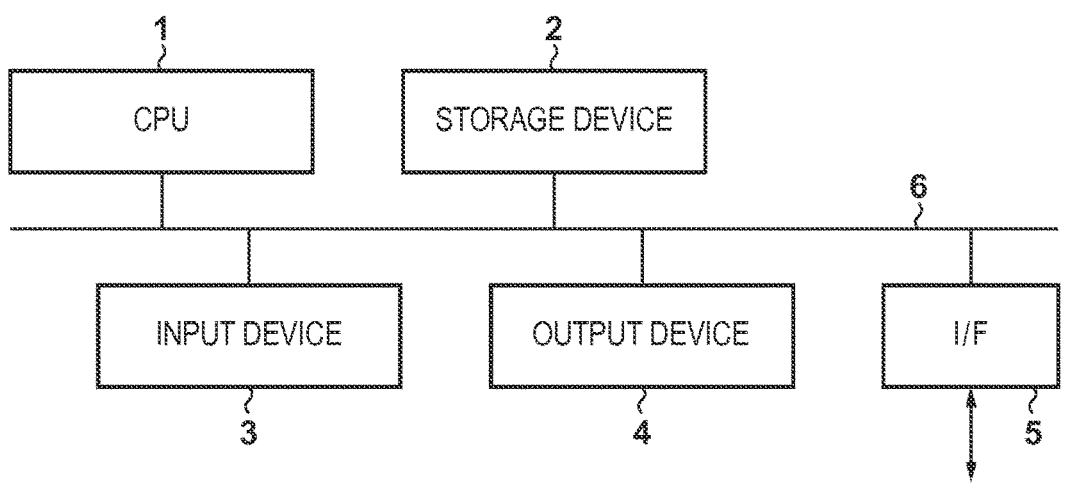
FIG. 12 is a block diagram showing an example of the hardware arrangement of an apparatus applicable to the image retrieval apparatus 1000.

An example of the hardware arrangement of an apparatus such as a PC (Personal Computer) applicable to the image retrieval apparatus 1000 will be described with reference to the block diagram of FIG. 12. Note that the arrangement shown in FIG. 12 is merely an example, and various other arrangements are considerable.

A CPU (Central Processing Unit) 1 controls the operation of the entire apparatus using computer programs and data stored in a storage device 2, and executes each of the processes described above as processes to be performed by the image retrieval apparatus 1000.

The storage device 2 is formed from, for example, a magnetic storage device, a semiconductor memory, or the like, and configured to implement the data holding function of the background image storage unit 300, the camera image storage unit 100, and the feature amount storage units 550, 630, and 850. The storage device 2 stores the OS (Operating System), and computer programs and data to be used by the CPU 1 to execute the processes according to the flowcharts of FIGS. 3, 6, 9, and 11. The computer programs include computer programs used by the CPU 1 to implement functions other than the data holding function of the background image storage unit 300, the camera image storage unit 100, and the feature amount storage units 550, 630, and 850. The computer programs also include computer programs used by the CPU 1 to execute each of the processes described above as processes to be performed by the functional units other than the background image storage unit 300, the camera image storage unit 100, and the feature amount storage units 550, 630, and 850. The data include data handled as known information in the above description.

The CPU 1 executes each of the processes described above as processes to be performed by the image retrieval apparatus 1000 by executing processing using the computer programs and data stored in the storage device 2.

An input device 3 is an input interface such as a mouse, a keyboard, a touch panel device, buttons, or the like. The operator of the apparatus operates the input device 3, thereby inputting various kinds of instructions to the CPU 1. For example, a user input described in the above embodiment can be input to the CPU 1 when the operator operates the input device 3.

An output device 4 is formed from a CRT or a liquid crystal screen and can display the processing result of the CPU 1 by an image, characters, or the like. For example, information output from the retrieval result output unit 700 is displayed on the display screen of the output device 4. Note that the output device 4 is not limited to a display device, and any other device that prints on a printing medium such as paper may be used.

An I/F (interface) 5 is used to do communication between the camera group and the apparatus. The apparatus acquires captured images from the cameras via the I/F 5. The above-described units are connected to a bus 6.

Note that the apparatus may include, for example, an I/O device used to do communication between various kinds of apparatuses. For example, the I/O device is a memory card, the input/output unit of a USB cable or the like, or a transmission/reception unit of wired or wireless commutation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-064342, filed Mar. 26, 2014, which is hereby incorporated by reference herein in its entirety.

What is claimed is:

1. An image retrieval apparatus comprising:
a selection unit configured to sequentially select each of a plurality of cameras;
a first acquisition unit configured to acquire, from an image group captured by a camera selected by the selection unit, an image that does not include a retrieval target object as a background image;
a second acquisition unit configured to acquire an image including the retrieval target object as a query image;
an extraction unit configured to extract feature amounts having different dimensions from each of the background image and the query image;
a learning unit configured to learn, for each sub-group of feature amounts having same dimension in a group of the feature amounts that the extraction unit extracts from the background image and the query image, a discriminator used for identifying the retrieval target object from an image captured by the selected camera to obtain weights corresponding to the sub-group; and
a retrieval unit configured to utilize the sub-group and the weights corresponding to the sub-group to retrieve the retrieval target object from the image group captured by the selected camera, wherein the retrieval unit is configured to utilize the sub-group and the weights corresponding to the sub-group in an order of a sub-set based on a dimension of or an evaluation result of the sub-set.

2. The apparatus according to claim 1, wherein the first acquisition unit extracts a region where a change amount between frames is not more than a predetermined value from images of frames captured within a predetermined capturing period out of the image group captured by the selected camera, and acquires a composite image formed by compositing images in the extracted regions as the background image.

3. The apparatus according to claim 1, wherein letting D1, D2, . . . , DN (N is an integer: N≥2) be different numbers of dimensions, and D1<D2< . . . <DN, the retrieval unit calculates an evaluation value E(i) using the feature amount of the number Di of dimensions (1≤i<N−1) and a weight corresponding to the feature amount of the number Di of dimensions, calculates an evaluation value E(i+1) if the evaluation value E(i) is not less than a threshold, cancels calculation of an evaluation value E(i+1) if the evaluation value E(i) is less than the threshold, and outputs the image captured by the selected camera as a retrieval result if an evaluation value E(N) is not less than the threshold.

4. The apparatus according to claim 1, wherein letting D1, D2, . . . , DN (N is an integer: N≥2) be different numbers of dimensions, and D1<D2< . . . <DN, the image retrieval apparatus further comprises a unit configured to perform, for each of the numbers D1, D2, . . . , DN of dimensions, identification evaluation of the discriminator learned using the feature amount of the number of dimensions, and when the numbers D1, D2, . . . , DN of dimensions are arranged in ascending order of identification evaluation as D'1, D'2, . . . , D'N, the retrieval unit calculates an evaluation value E(i) using the feature amount of the number D'i of dimensions (1≤i<N−1) extracted from the image captured by the selected camera and a weight corresponding to the feature amount of the number D'i of dimensions, calculates an evaluation value E(i+1) if the evaluation value E(i) is not less than a threshold, cancels calculation of an evaluation value E(i+1) if the evaluation value E(i) is less than the threshold, and outputs the image captured by the selected camera as a retrieval result if an evaluation value E(N) is not less than the threshold.

5. An image retrieval method performed by an image retrieval apparatus, the method comprising:
sequentially selecting each of a plurality of cameras;
acquiring, from an image group captured by a camera selected in the selection, an image that does not include a retrieval target object as a background image;
acquiring an image including the retrieval target object as a query image;
extracting feature amounts having different dimensions from each of the background image and the query image;
learning, for each sub-group of feature amounts having same dimension in a group of the feature amounts extracted from the background image and the query image, a discriminator used for identifying the retrieval target object from an image captured by the selected camera to obtain weights corresponding to the sub-group; and utilizing the sub-group and the weights corresponding to the sub-group to retrieve the retrieval target object from the image group captured by the selected camera, wherein the retrieval utilizes the sub-group and the weights corresponding to the sub-group in an order of a sub-set based on a dimension of or an evaluation result of the sub-set.

6. A non-transitory computer-readable storage medium storing a computer program that causes a computer to function as:

a selection unit configured to sequentially select each of a plurality of cameras;

a first acquisition unit configured to acquire, from an image group captured by a camera selected by the selection unit, an image that does not include a retrieval target object as a background image;

a second acquisition unit configured to acquire an image including the retrieval target object as a query image;

an extraction unit configured to extract feature amounts having different dimensions from each of the background image and the query image;

a learning unit configured to learn, for each sub-group of feature amounts having same dimension in a group of the feature amounts that the extraction unit extracts from the background image and the query image, a discriminator used for identifying the retrieval target object from an image captured by the selected camera to obtain weights corresponding to the sub-group; and a retrieval unit configured to utilize the sub-group and the weights corresponding to the sub-group in an order of a sub-set based on a dimension of or an evaluation result of the sub-set to retrieve the retrieval target object from the image group captured by the selected camera.

* * * * *